Feb. 7, 1939. F. J. SCHOLL 2,146,132
GUARD FOR FINGER AND TOE NAIL CLIPPERS
Filed March 4, 1938
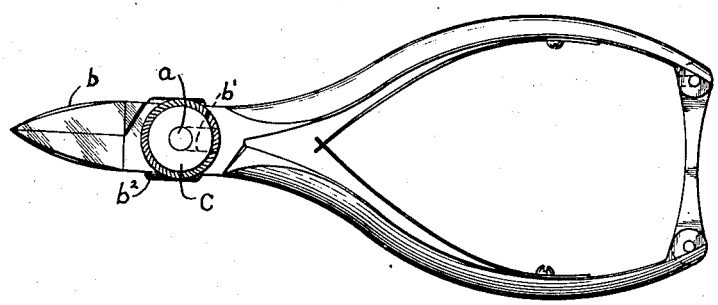
Inventor
FRANK JOHN SCHOLL Patented Feb. 7, 1939

2,146,132

UNITED STATES PATENT OFFICE 2,146,132

GUARD FOR FINGER AND TOE NAIL CLIPPERS

Frank John Scholl, London, England, assignor to The Scholl Mfg. Co., Inc., Chicago, Ill., a corporation of New York Application March 4, 1938, Serial No. 193,821
In Great Britain May 21, 1937

1 Claim. (Cl. 30—29)

This invention relates to improvements in a guard composed of transparent material adapted to be attached particularly to clippers or cutters for finger or toe nails, although the invention may be attached to clippers or cutters for other uses and purposes as will be apparent to one skilled in the art.

In the use of ordinary toe nail or finger nail clippers, the clippings ordinarily fly about, which is undesirable not only from the standpoint of uncleanliness, but as such clippings are often septic, they may be injurious if, for example, they should fly into the operator's eye. Accordingly, it is desirable to provide a guard for such clippers or cutters, which guard not only prevents the clippings from flying about, but also permits the operator to view at all times the operation to be performed.

It accordingly is an object of this invention to provide a guard constructed of transparent cellulose material or of glass of the unbreakable variety which may be removably attached to ordinary clippers or cutters.

It is a further object of this invention to provide a guard adapted to be attached to clippers, which guard not only prevents clippings from flying about, but in view of its close association with the clippers, retains the greater portion of such clippings so that they may be readily disposed of.

Another object of the invention is to provide a guard for clippers which may be readily removed from said clippers to permit of cleaning of the clipper blades.

A still further object of this invention is to provide a guard so shaped as to be readily usable with clippers of varying cross-sections.

While some of the more salient features, characteristics and advantages of the present invention have been above pointed out, others will become apparent from the following disclosures taken in conjunction with the accompanying drawing, in which:

Figure 1 is a plan view of a form of clippers showing the guard attached thereto;

Figure 2 is a side elevational view thereof;

Figure 3 is a top plan view of the guard; and

Figure 4 is a side elevational view thereof.

As shown on the drawing:

Figures 1 and 2 of the drawing show a conventional pair of clippers joined together by a pin $a$ threaded at its outer end, which pin extends a slight distance above the upper cutting blade member.

A guard $b$ is formed with a slot $b1$, through which the projecting end of the pin $a$ extends. This guard $b$ is of a size slightly larger than the blade assembly so as to extend a short distance thereover and is formed to fit the contour of the blade. The guard $b$ is provided with downwardly turned lugs $b2$ which are adapted to embrace the sides of the upper blade member rearward of its cutting edge.

A milled nut $c$ is threaded on said pin $a$ and is adapted not only to hold the two blade members of the clipper together, but also to clamp the guard in position upon the upper blade member.

From the foregoing, it will be seen that to position the guard upon the clippers, it is only necessary to loosen the milled nut $c$; the guard is then slipped over the upper blade member, after which the nut is adjusted to firmly hold the guard in position.

In use, as the blade members are moved but a slight distance away from each other, the clippings are retained between said blades and the guard. Accordingly, such clippings retained in the space between the blades and the guard may be released by opening the blade or moving the guard.

While the guard is shown curved to accommodate the form of clippers disclosed in the drawing, it will be obvious that the guard may be shaped to accommodate various forms of clippers.

I am aware that many changes may be made and details of construction may be varied through a wide range without departing from the principles of this invention, and I therefore do not purpose limiting the patent granted hereon otherwise than is necessitated by the prior art.

I claim as my invention:

A guard for use with clippers for cutting finger and toe nails with the clippers having a pair of jaws pivoted about a common pivot point and a pair of handles connected to the jaws, said guard consisting of a single piece of transparent material and including a forward portion to overlie the jaws of the clipper and also including a rear portion terminating adjacent the pivot of the clippers to leave the handles unimpeded for use in the hand, and integrally formed depending lugs in spaced opposed relation on said rear portion for disposition on opposed sides of a jaw adjacent the pivot.

FRANK JOHN SCHOLL.